United States Patent [19]

Amano et al.

[11] 4,386,974

[45] Jun. 7, 1983

[54] HYDROGEN STORAGE MATERIAL

[75] Inventors: Muneyuki Amano, Chiba; Yasuo Sasaki, Tokyo, both of Japan

[73] Assignee: National Research Institute for Metals, Tokyo, Japan

[21] Appl. No.: 333,716

[22] Filed: Dec. 23, 1981

Related U.S. Application Data

[63] Continuation of Ser. No. 133,834, Mar. 25, 1980, abandoned.

[30] Foreign Application Priority Data

Jul. 19, 1979 [JP]   Japan ................................ 54-90953

[51] Int. Cl.$^3$ ...................... C22C 14/00; C22C 29/00; C22C 38/14
[52] U.S. Cl. ..................................... 148/31; 148/421; 148/442; 420/900; 423/644
[58] Field of Search ............. 75/175.5, 123 R, 123 M, 75/122; 148/31, 32; 423/594, 598, 644

[56] References Cited

FOREIGN PATENT DOCUMENTS 193611 11/1957 Austria ................................ 420/417

OTHER PUBLICATIONS

Sandrock, G. D., et al.; "Metallurgical Considerations in the Production and Use of FeTi Alloys for Hydrogen Storage"; Proc. 11th Inter. Energy Conv. Eng. Conf. AICHE, pp. 965–971, (1976).

Andresen, A. et al., Ed.; *Hydrides for Energy Storage*, Pergamon Press; "Hydrides for Energy Storage", pp. 353–393, (8/77).

*Primary Examiner*—Michael L. Lewis
*Attorney, Agent, or Firm*—Sherman & Shalloway

[57] ABSTRACT

A hydrogen storage material comprising a composite material comprising a matrix of an alloy consisting essentially of iron and titanium in an iron/titanium atomic ratio of 1/1.04–1.40, and dispersed therein as separate phases, a metallic oxide composed of iron, titanium and oxygen.

6 Claims, 13 Drawing Figures

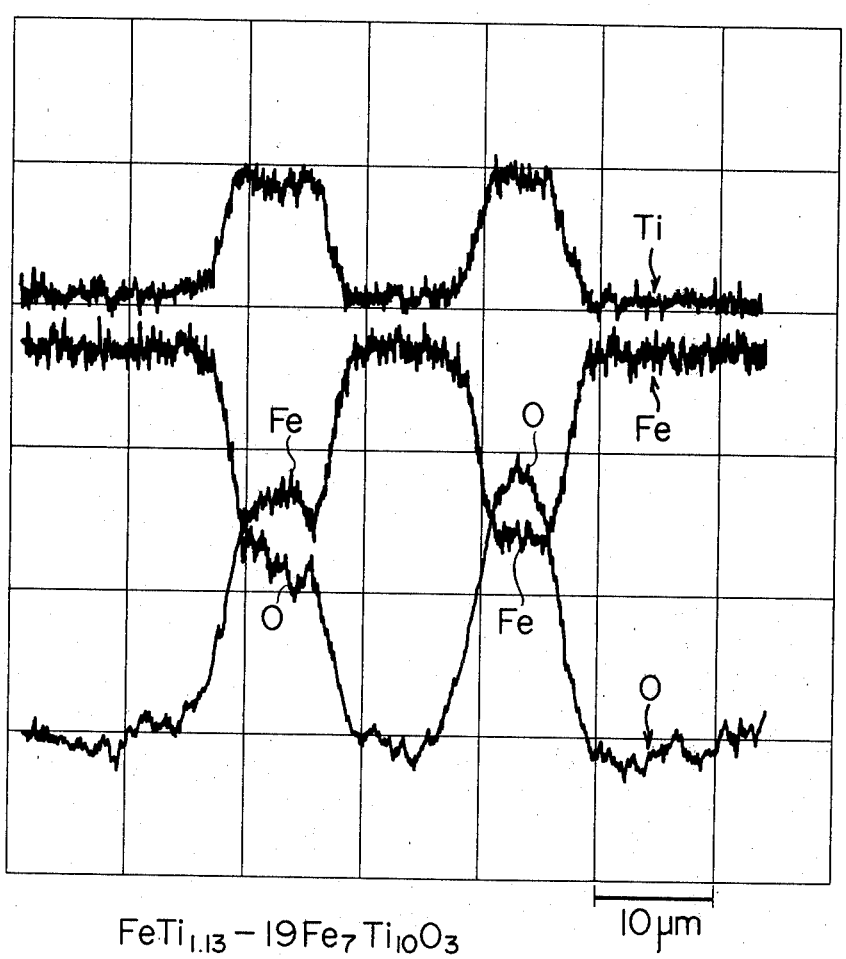

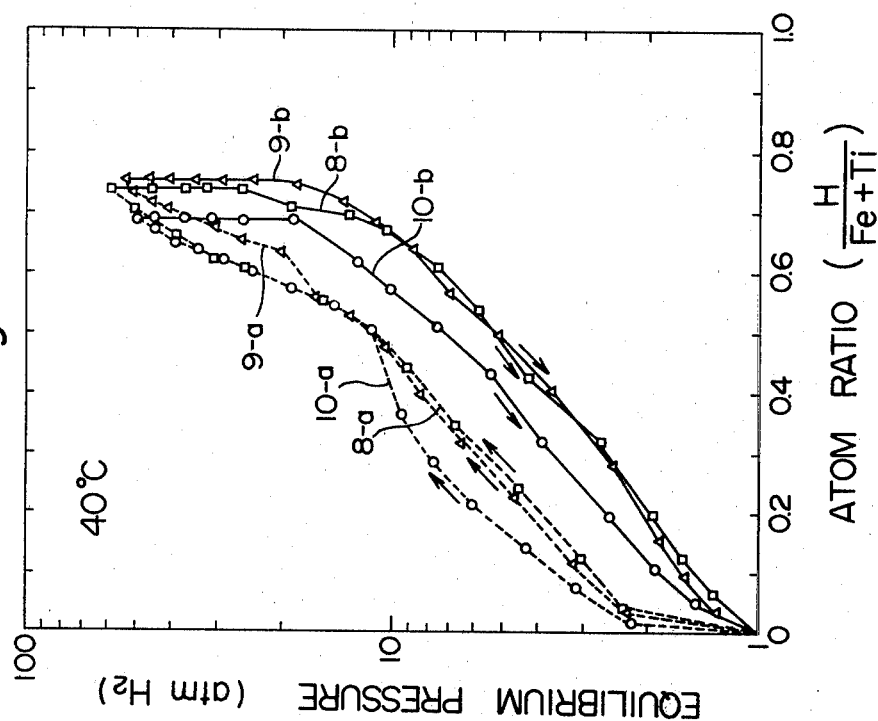
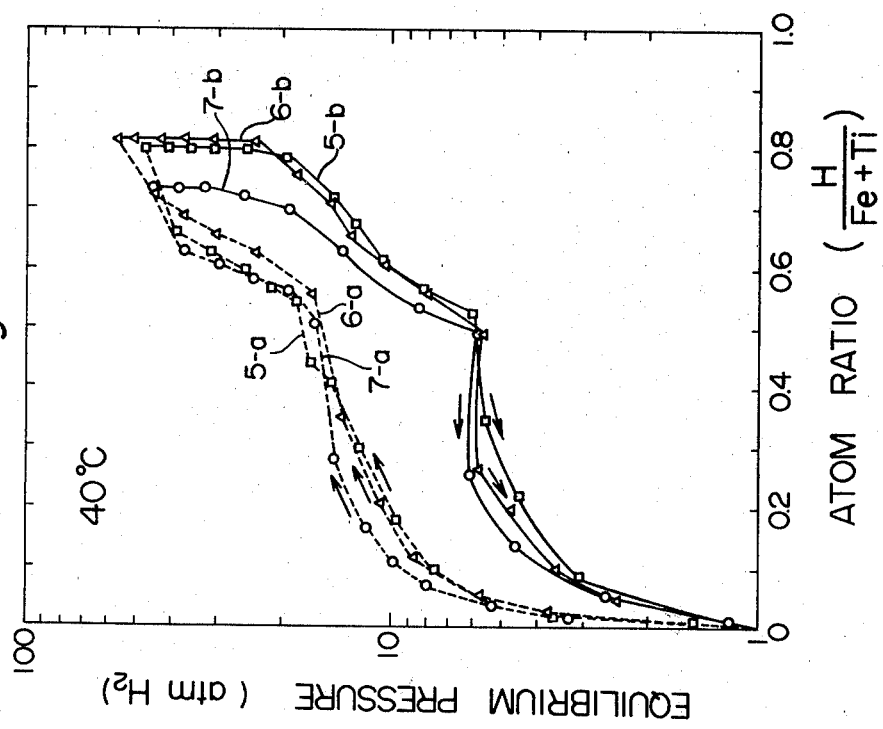

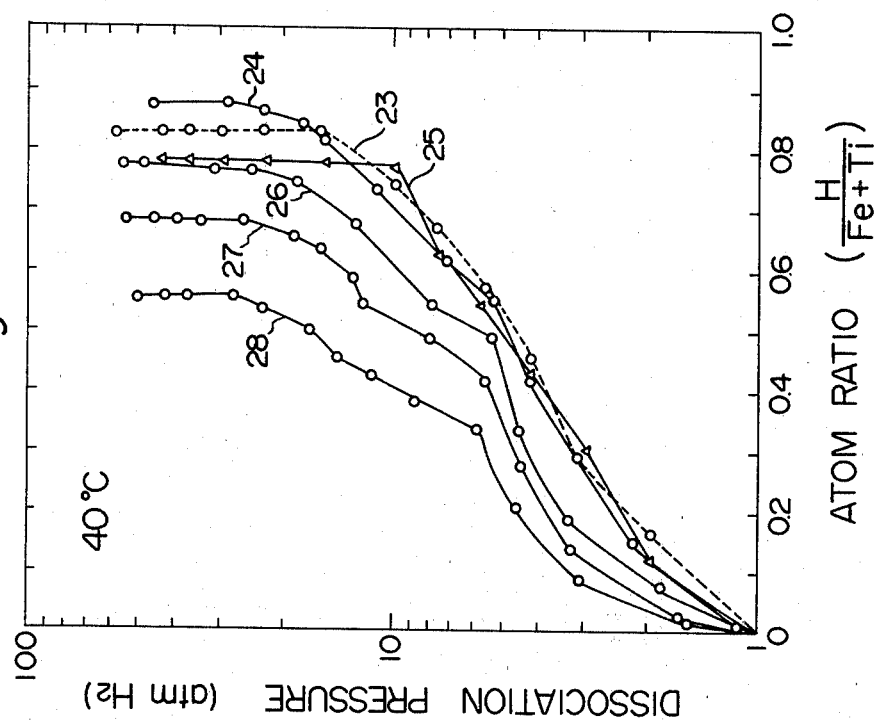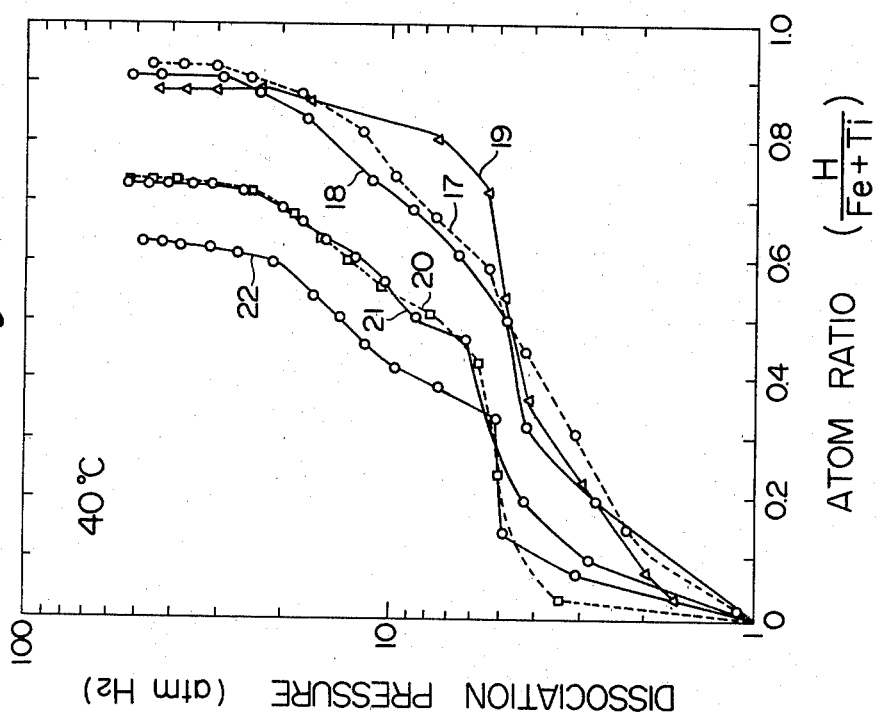

HYDROGEN STORAGE MATERIAL

This is a continuation of application Ser. No. 133,834, filed Mar. 25, 1980, now abandoned.

This invention relates to a hydrogen storage material. More specifically, this invention relates to a hydrogen storage material comprising iron, titanium and iron-titanium oxide capable of absorbing a large quantity of hydrogen at room temperature and of releasing a large quantity of the absorbed hydrogen at room temperature.

It has been suggested recently to utilize intermetallic compounds capable of storing hydrogen in almost equal or higher densities to or than liquid hydrogen in storing or transporting hydrogen. For example, iron-titanium, lanthanum-nickel, Mischmetal-nickel, calcium-nickel, titanium-manganese, magnesium-nickel, and magnesium-copper are known as such intermetallic compounds.

The lanthanum-nickel and Mischmetal-nickel intermetallic compounds can be easily converted to hydrides, but have the defect that they are difficult to produce and are susceptible to oxidation.

The titanium-manganese intermetallic compound can be easily converted to a hydride, but has the defect that in releasing hydrogen, a large amount of hydrogen remains at atmospheric pressure and room temperature.

The magnesium-nickel intermetallic compound and magnesium alloys containing this intermetallic compound have the advantage of being able to store a large amount of hydrogen per unit weight, but suffer from the defect that to release hydrogen at atmospheric pressure to several atmospheres, they have to be heated to a temperature of at least 300° C. to increase their dissociation equilibrium pressure to the aforesaid pressures.

The iron-titanium intermetallic compound (FeTi), on the other hand, is considered to be most promising as a hydrogen storage material because it has superior hydrogen storing characteristics and is relatively inexpensive. However, it suffers from the disadvantage that its activation for hydrogen absorption is difficult and the hydrogen absorbing equilibrium pressure at room temperature is fairly high. For example, to activate FeTi, it must be pulverized to fine particles, for example those having a particle diameter smaller than 100 mesh (Tyler's mesh) and then heated to a temperature of as high as 200° to 400° C. in hydrogen under a pressure of several tens of atmospheres.

In order to facilitate the activation of FeTi and lower the hydrogen absorbing pressure at the time of hydride formation, it has been known to substitute niobium, manganese or titanium for a part of Fe In FeTi. To eliminate the aforesaid defects of FeTi by using an intermetallic compound containing niobium, it is necessary to substitute niobium for several % by weight of Fe. Hence, the resulting compound is expensive and is economically disadvantageous. Intermetallic compounds having manganese or titanium substituted for a part of Fe cause a large amount of hydrogen to remain therein, and therefore, the amount of hydrogen they can release is reduced.

It is an object of this invention therefore to provide a hydrogen storage material which eliminates the aforesaid defects of conventional intermetallic compounds and can withstand practical use.

Another object of this invention is to provide a hydrogen storage material which does not require activating treatment, has a high rate of hydrogen absorption and a low hydrogen absorbing equilibrium pressure and which can store and release hydrogen in great quantities at room temperature.

Still another object of this invention is to provide a low-cost hydrogen storage material.

Other objects and advantages of this invention will become apparent from the following description.

According to this invention, these objects and advantages can be achieved by a hydrogen storage material comprising a composite material comprising a matrix of an alloy consisting essentially of iron and titanium in an iron/titanium atomic ratio of 1/1.04–1.40, and dispersed therein as separate phases, a metallic oxide composed of iron, titanium and oxygen.

Thus, the hydrogen storage material of this invention comprises a composite material comprising (1) a matrix of an alloy consisting essentially of iron and titanium in an iron/titanium atomic ratio of 1/1.04–1.40, and (2) dispersed therein as separate phases, a metallic oxide comprising iron, titanium and oxygen.

A hydrogen storage material composed of a metallic matrix of iron and titanium in an atomic ratio of 1:1 and a metallic oxide composed of iron, titanium and oxygen present therein is known [Proc. 11th Intersociety Energy Conversion Engineering Conference, AIChE, 965 (1976)]. This article states that since FeTi having an iron/titanium atomic ratio of 1/1 has a strong affinity for hydrogen in the molten state and takes oxygen from air or from common oxide crucibles to form an oxygen stabilized phase having the composition $Fe_7Ti_{10}O_3$, its maximum H-level, that is the amount of hydrogen stored, is decreased, and therefore that for production of FeTi particles, consideration must be given to means for preparing FeTi with 0 contents as low as practical within reasonable economic constraints.

Thus, as seen in the aforesaid literature reference, in an intermetallic compound of iron and titanium in an atomic ratio of 1:1 (actually since it reacts with oxygen to form $Fe_7Ti_{10}O_3$, iron is evidently somewhat in excess of titanium in the resulting alloy matrix), the absence of oxide was desirable and recommended in order to use it as a hydrogen storage material. In view of this conventional technique, the fact elucidated by the present inventors is unexpected and surprising.

The present invention, in its broadest concept, provides a composite material having a metallic matrix consisting essentially of iron and titanium with an iron/titanium atomic ratio of 1/1.04–1.40.

This metallic matrix can be expressed by the following formula $$FeTi_x$$

wherein x is 1.04 to 1.40. If x is less than 1.04, the composite material exhibits much the same properties as a composite material having a metallic matrix with an iron/titanium atomic ratio of 1:1 to a value in which iron is more than titanium, and is undesirable as a hydrogen storage material. If x is larger than 1.40, the amount of residual hydrogen is large, and the amount of hydrogen released is small. Hence, the resulting composite material is not suitable as a hydrogen storage material.

The metallic matrix in accordance with this invention forms a single FeTi phase when the x is in the range of 1.04 to about 1.1. When x exceeds about 1.1, a phase of a solid solution of Ti forms and a mixture of the FeTi phase and the solid solution phase results.

The metallic matrix in accordance with this invention may be a single FeTi phase, or a mixed phase of the FeTi phase and the solid solution phase mentioned above. There is a general tendency that as the metallic matrix increases in the proportion of the solid solution phase, the rate of hydrogen absorption increases and the amount of remaining hydrogen in releasing hydrogen increases. Investigations of the present inventors have shown that even when the proportion of the solid solution phase of the metallic matrix increases, so long as the iron/titanium atomic ratio is within the aforesaid range ($x = 1.04$ to $1.40$), the hydrogen storage material of this invention can store hydrogen which can be released in a great amount.

The composite material in accordance with this invention contains a metallic oxide composed of iron, titanium and oxygen dispersed as separate phases in the aforesaid metallic matrix in which titanium is in excess of iron. The composite material in accordance with this invention is produced by an arc-melting method to be described below. In the step of cooling the melt in the manufacturing process, the aforesaid metallic oxide is spontaneously and uniformly dispersed as fine separated phases as islands in the metallic matrix. The structural characteristic of the present invention is that the metallic oxide is dispersed as islands in the sea of the metallic matrix. The proportion of the metallic oxide dispersed is preferably 0.5 to 28% by weight, more preferably 1.5 to 9% by weight, based on the weight of the entire composite material. Electron probe X-ray microanalysis has shown that the aforesaid metallic oxide in accordance with this invention has an iron/titanium/oxygen atomic ratio of $1/1.4$-$2.5/0.4$-$0.6$.

Specifically, investigations of the present inventors have shown that the concentration of titanium in the metallic oxide dispersed in the metallic matrix seems to increase gradually with increasing ratio of titanium to iron (namely, with increasing x), and therefore that in the hydrogen storage material of this invention, the metallic oxide is not limited to a specified single composition only. For example, empirical formulae $Fe_7Ti_{11}O_4$, $Fe_5Ti_{10}O_3$, $Fe_6Ti_{11}O_3$, $Fe_7Ti_{13}O_3$, and $Fe_7Ti_{10}O_3$ can be assigned to such a metallic oxide.

In the most preferred embodiment, the composite material of this invention comprises a metallic matrix consisting essentially of iron and titanium with a Ti/Fe atomic ratio of $1.04$-$1.40/1$, preferably $1.08$-$1.30/1$, and dispersed uniformly therein as separated phases 0.5 to 28% by weight, preferably 1.5 to 9% by weight, of a metallic oxide.

Advantageously, the composite material of this invention can be produced very easily by an arc-melting method. Specifically, it can be produced, for example, by subjecting a predetermined amount of precisely weighed sponge titanium, titanium foil, electrolytic iron and ferric oxide to arc-melting in an atmosphere of an inert gas such as argon or helium, cooling the product and pulverizing the resulting ingot. Desirably, ferric oxide is powdery, and is melted while it is enveloped with titanium foil. Pulverization of the ingot can be carried out in the air. If it is pulverized to a particle size smaller than about 80 Tyler's mesh, especially smaller than about 100 Tyler's mesh, it can be used as a hydrogen storage material.

BRIEF DESCRIPTION OF THE DRAWINGS

FIGS. 1, 2, and 4 to 12 are hydrogen absorption curves.

FIG. 3a, is a microprobe analysis.

FIG. 1 of the accompanying drawings show hydrogen absorption curves of composite materials of this invention obtained by pulverizing ingots produced by arc-melting to a size smaller than 100 Tyler's mesh. Referring to FIG. 1, curve 2 is a hydrogen absorption curve of a composite material of this invention comprising a metallic material having the composition $FeTi_{1.13}$ and dispersed therein 1.9% by weight, based on the weight of the entire composite material, of an oxide composed of iron, titanium and oxygen. As stated hereinabove, the composite material of this invention is not limited to a metallic oxide having one specified composition, but may include metallic oxides having an iron:titanium:oxygen atomic ratio within the aforesaid range. In FIG. 1 and other drawings accompanying the application, the metallic oxide is given as having the composition $Fe_7Ti_{10}O_3$ for the sake of convenience in order to specify the weight proportion of the included metallic oxide. According to this method of expression, the curve 2 in FIG. 1 is expressed as $FeTi_{1.13}$-$1.9Fe_7Ti_{10}O_3$. Curve 3 is a hydrogen absorption curve of $FeTi_{1.13}$-$8.8Fe_7Ti_{10}O_3$. Curves 1 and 4 are respectively hydrogen absorption curves of $FeTi_{1.13}$ and FeTi given for the sake of comparison. These hydrogen absorption curves are prepared by setting the respective composite materials in a pressure reactor, evacuating the reactor to a pressure of $2 \times 10^{-6}$ mmHg, and introducing hydrogen gas of 99.99999% purity at 25° C. at 60 atmospheres. In FIG. 1, the abscissa represents the time (minutes) elapsed after the introduction of hydrogen at 60 atmospheres, and the ordinate, the number of hydrogen atoms absorbed based on the total number of iron and titanium atoms contained in the composite material.

Figure 1:
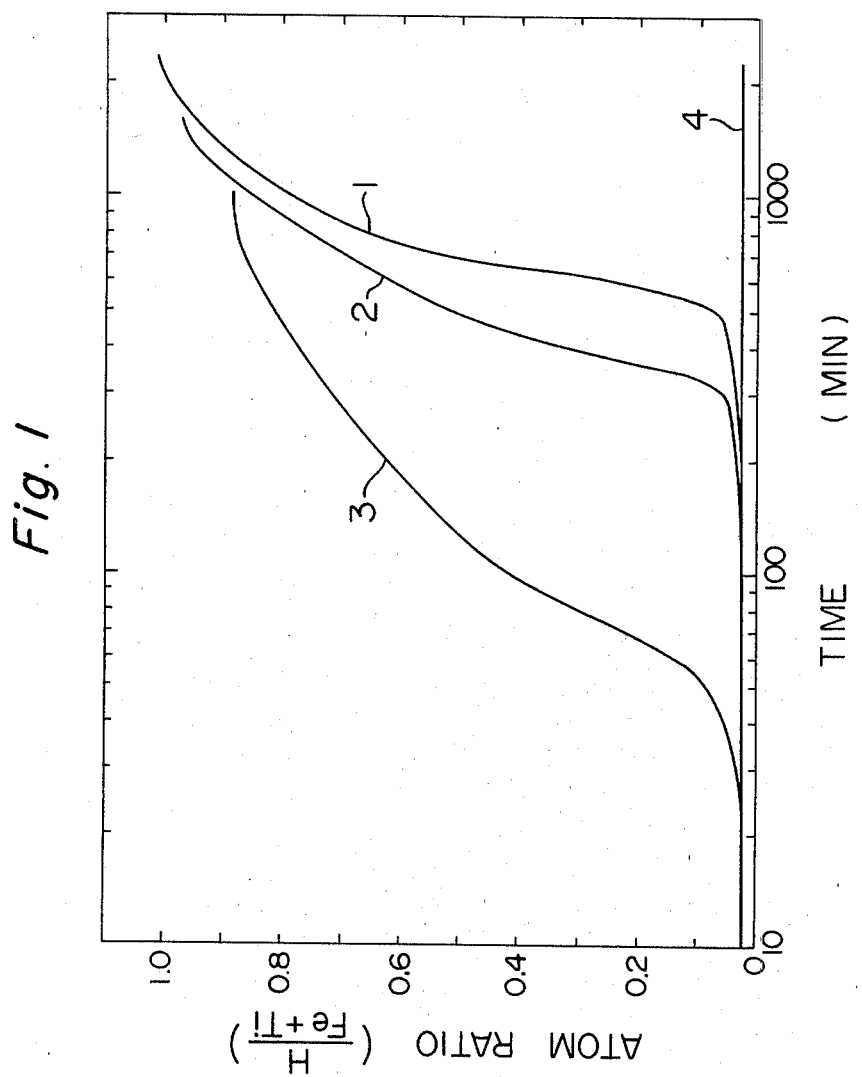

It is seen from FIG. 1 that FeTi having an iron/titanium atomic ratio of 1/1 (curve 4) does not substantially begin to absorb hydrogen even after a lapse of 1000 minutes. In order for such FeTi to begin hydrogen absorption at 25° C. and 60 atmospheres (for example, within 10 minutes), it must be first subjected to activating treatment in hydrogen at 50 atmospheres at about 200° C.

$FeTi_{1.13}$ having more titanium than iron (curve 1) exhibits the property of absorbing hydrogen even when it is not subjected to activating treatment, the time required for substantially initiating hydrogen absorption is still long, and is about 500 minutes.

In contrast, $FeTi_{1.13}$-$1.9Fe_7Ti_{10}O_3$ (curve 2) and $FeTi_{1.13}$-$8.8Fe_7Ti_{10}O_3$ (curve 3) of the present invention without activating treatment begin substantial hydrogen absorption faster than FeTi and $FeTi_{1.13}$. It is particularly surprising to note that a composite material having a large content of oxide (curve 3) begins hydrogen absorption faster. By repeating several times a cycle of absorbing hydrogen in this manner and then releasing hydrogen, the rate of absorbing hydrogen becomes so fast that hydrogen can be absorbed to saturation within 10 minutes.

Figure 2:
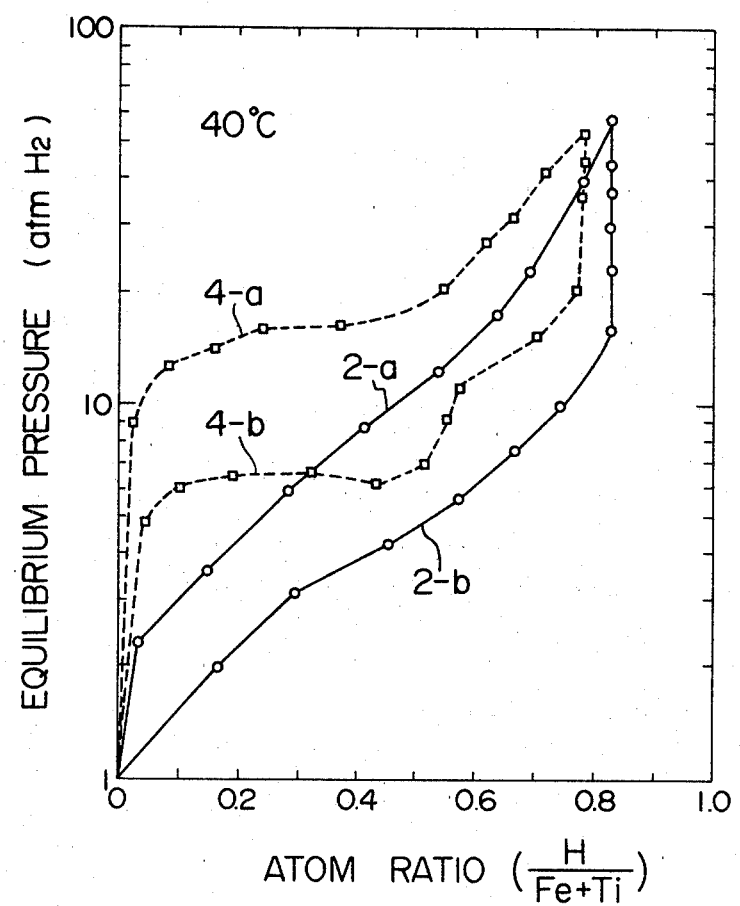

FIG. 2 of the accompanying drawings shows hydrogen absorption isothermal curves at 40° C. (curves 2-a and 4-a), and hydrogen releasing isothermal curves (curves 2-b and 4-b). In FIG. 2, the abscissa represents the number of hydrogen atoms absorbed per total iron and titanium atoms contained in the composite material, and the ordinate, the hydrogen equilibrium pressure (atom. $H_2$). Curves 2-a and 2-b refer to $FeTi_{1.13}$-$1.9Fe_7Ti_{10}O_3$, and curves 4-a and 4-b, to FeTi for comparison.

A comparison of curve 2-a with curve 4-a in FIG. 2 shows that the curve 2-a (the composite material of this invention) is located at a lower level, and therefore that the composite material in accordance with this invention can absorb hydrogen even at a low hydrogen pressure, and exhibit the property of absorbing a larger amount of hydrogen at the same hydrogen pressure. For example, when the hydrogen pressure is 10 atmospheres, FeTi (curve 4-a) scarcely absorbs hydrogen, but the composite material in accordance with this invention (curve 2-a) can absorb hydrogen at an atomic ratio of up to about 0.45. l The amount of hydrogen absorption at an atomic ratio of up to about 0.45 means that about 110 cc of hydrogen at 1 atm. and 0° C. is absorbed per gram of composite material.

A comparison of curve 2-b with curve 4-b in FIG. 2 shows that the curve 2-b (the composite material in accordance with this invention) is located at a lower level. This means that the composite material in accordance with this invention releases hydrogen at a lower pressure than FeTi. The composite material in accordance with this invention releases nearly all of the absorbed hydrogen at a releasing pressure of 1 atmosphere, and there is substantially no remaining hydrogen. Hence, no problem resides with the releasing of hydrogen. If it is desired to take out hydrogen at a higher pressure from the composite material of this invention which has absorbed hydrogen, the temperature at the time of hydrogen releasing is slightly elevated.

Table 1 below shows the maximum amount of the absorbed hydrogen which is released per gram of the composite material of this invention using the content of the metallic oxide as a parameter. The temperature for hydrogen releasing is 40° C., and the atmosphere into which hydrogen is released is an open air atmosphere. The amount of hydrogen released is calculated for that at 0° C. and 1 atm.

TABLE 1

| Content of metallic oxide (y, wt. % as $Fe_7Ti_{10}O_3$) | Amount of hydrogen released (cc/g) | |
|---|---|---|
| | $FeTi_{1.08}$—$yFe_7Ti_{10}O_3$ | $FeTi_{1.13}$—$yFe_7Ti_{10}O_3$ |
| 0 | 201 | 190 |
| 1.0 | 197 | 200 |
| 1.9 | 192 | 183 |
| 8.8 | 159 | 164 |
| 16.8 | 158 | 148 |
| 28.0 | 137 | 122 |

It is seen from Table 1 that the composite material in accordance with this invention contains a metallic oxide having no hydrogen absorbing ability, the amount of hydrogen released per unit weight decreases with increasing content of the metallic oxide. Despite this tendency, the absolute amount of hydrogen released by the composite material of this invention is still large, and composite materials having a metallic oxide content of up to several % by weight release an amount of hydrogen which is comparable to intermetallic compounds free from oxides.

As is clearly seen from the above description, the composite material suitable for use as a hydrogen storage material in accordance with this invention does not require any activating treatment such as high-temperature heat treatment prior to hydrogen absorption, and can rapidly absorb hydrogen at room temperature and easily release the absorbed hydrogen. The amount of hydrogen absorbed can reach the same level as the density of liquid hydrogen. The storage pressure may be not more than several tens of atmospheres and no special high-pressure container is required for storage. As is clearly seen from the constituent elements and the manufacturing method, the composite material in accordance with this invention is inexpensive, and is expected to be useful as a hydrogen storage material for use in large-sized hydrogen storage tanks.

The following Examples illustrate the present invention in greater detail. It should be understood however that the invention is not limited to these examples.

EXAMPLE 1

Electrolytic iron (46.93 parts by weight), 48.49 parts by weight of sponge titanium, 1.25 parts by weight of titanium foil (20 microns in thickness) and 3.3 parts by weight of powdery ferric oxide (the powdery ferric oxide was enveloped with the titanium foil) were put into a copper crucible cooled by water, and subjected to arc melting in an argon atmosphere to form an ingot having the composition $FeTi_{1.13}$-$19Fe_7Ti_{10}O_3$.

The ingot was coarsely pulverized, and a specimen for electron probe X-ray microanalysis was prepared from the pulverized masses using a polishing paper and a polishing cloth in the same way as in the preparation of ordinary specimens for observation with an optical microscope. When the polishing cloth was used, polishing alumina powder having a size of 1 micron and 0.05 microns respectively was used.

Figure 3B:
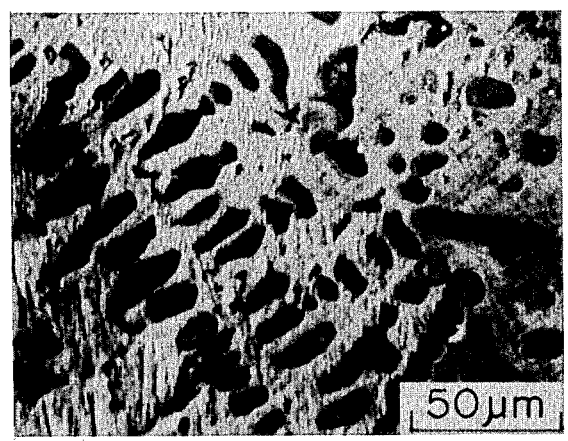
FIG. 3b, is a photograph of the phases.

The specimens were subjected to electron microprobe analysis at an acceleration voltage of 10 kV using Shimadzu EMX (an equipment made by Shimazu Seisakusho Co., Ltd.). The resulting chart and the photograph of the back scattered electron image obtained are shown in FIGS. 3-a and 3-b. In the chart of FIG. 3-a, the abscissa represents the scanning distance, and the ordinate, the intensity of characteristic X-rays of the individual elements shown in the drawing. In the photograph of FIG. 3-a, some relatively black spots are seen to be aligned in relatively straight rows. The chart of FIG. 3-a shows the results of electron microprobe analysis which was performed so as to scan the spots seen in FIG. 3-b. The three lines seen in FIG. 3-a relate to iron (Fe), titanium (Ti) and oxygen (O).

It has been ascertained that the position at which the curve relating to oxygen goes down greatly shows a position between spots in the photograph, i.e. a position of the metallic matrix composed substantially of iron and titanium in the composite material of this invention.

Accordingly, the spots in the photograph of FIG. 3-b, are separate phases of metallic oxide (in this photograph, many of them have a long diameter of about 10 to about 20 microns) dispersed in the metallic matrix in the composite material of this invention, and contain large amount of oxygen.

To determine the iron, titanium and oxygen atomic ratio in the separated oxide phases which are seen as black spots in the photograph, pure iron and pure titanium (standard specimens) were subjected to electron microprobe analysis in the same way as above. The intensity of the standard specimens was taken as 100, and the intensities of iron and titanium specimens were determined. From the results, the weight percentages of iron and titanium contained in the oxide phases of the specimen were calculated, and the weight percent of oxygen was calculated by subtracting the weight percents of iron and titanium from 100.

The results led to the confirmation that a specimen expressed as having the composition $FeTi_{1.13}$-$19Fe_7Ti_{1.0}O_3$ actually have the approximate composition $Fe_7Ti_{1.3}O_3$ and contains an oxide composed of iron, titanium and oxygen.

Similarly, the following specimens were found to exist as oxides of the compositions indicated on the right side.

| | |
|---|---|
| $FeTi$—$9.5Fe_7Ti_{10}O_3$ | $Fe_7Ti_{11}O_4$ |
| $FeTi_{1.08}$—$9.5Fe_7Ti_{10}O_3$ | $Fe_5Ti_{10}O_3$ |
| $FeTi_{1.08}$—$38Fe_7Ti_{10}O_3$ | $Fe_5Ti_{10}O_3$ and $Fe_6Ti_{11}O_3$. |

EXAMPLE 2

Electrolytic iron (50.45 parts by weight), 47.97 parts by weight of sponge titanium, 1.25 parts by weight of titanium foil (thickness 20 microns) and 0.33 part by weight of powdery ferric oxide (the powdery ferric oxide was enveloped with the titanium foil) were put into a copper crucible cooled by water, and subjected to arc melting in an atmosphere of argon to obtain an ingot having the composition $FeTi_{1.13}$-$1.9Fe_7Ti_{10}O_3$.

The ingot was pulverized to a particle diameter smaller than 100 mesh using an agate mortar in the air to form a hydrogen storage material in accordance with this invention.

A predetermined amount of the pulverized material was charged into a pressure reactor, and the inside of the reactor was reduced in pressure to $5 \times 10^{-6}$ mmHg. Then, hydrogen having a purity of 99.99999% was introduced under a pressure of 60 atmospheres. The temperature was 25° C. The results are shown in curve 2 of FIG. 1, and curves 2-a and 2-b in FIG. 2.

A composite material having the composition $FeTi_{1.13}$-$8.8Fe_7Ti_{10}O_3$ produced in the same way as the composite material $FeTi_{1.13}$-$1.9Fe_7Ti_{10}O_3$, and intermetallic compounds having the compositions $FeTi$ and $FiTi_{1.13}$ were caused to absorb and release hydrogen in the $FeTi_{1.13}$-$1.9Fe_7$. composite $Ti_{10}O_3$.

The results obtained with regard to the composite material $FeTi_{1.13}$-$8.8Fe_7Ti_{10}O_3$ are shown in curve 3 of FIG. 1. Curve 1 in FIG. 1 shows the results obtained with regard to $FeTi_{1.13}$ (comparison), and curve 4 of FIG. 1 and curves 4-a and 4-b of FIG. 2 show the results obtained with regard to FeTi(comparison).

The abscissa of the absorption and releasing isothermal curves shown in FIG. 2 represents the amount of hydrogen which the composite material can release at 1 atm. at a given temperature (40° C. in FIG. 2). Thus, the amount of hydrogen represented by the abscissa does not contain that of hydrogen which cannot be released at 1 atm. at that temperature. This indication of the abscissa is the same for all of the other absorption and releasing isothermal curves (FIGS. 7 to 12).

EXAMPLE 3

Composite materials of the following compositions were produced and pulverized to a particle size smaller than 100 mesh in the same way as in Example 2.

(a) $FeTi_{1.04}$
(b) $FeTi_{1.04}$-$2.9Fe_7Ti_{10}O_3$
(c) $FeTi_{1.04}$-$9.5Fe_7Ti_{10}O_3$

Figure 4:
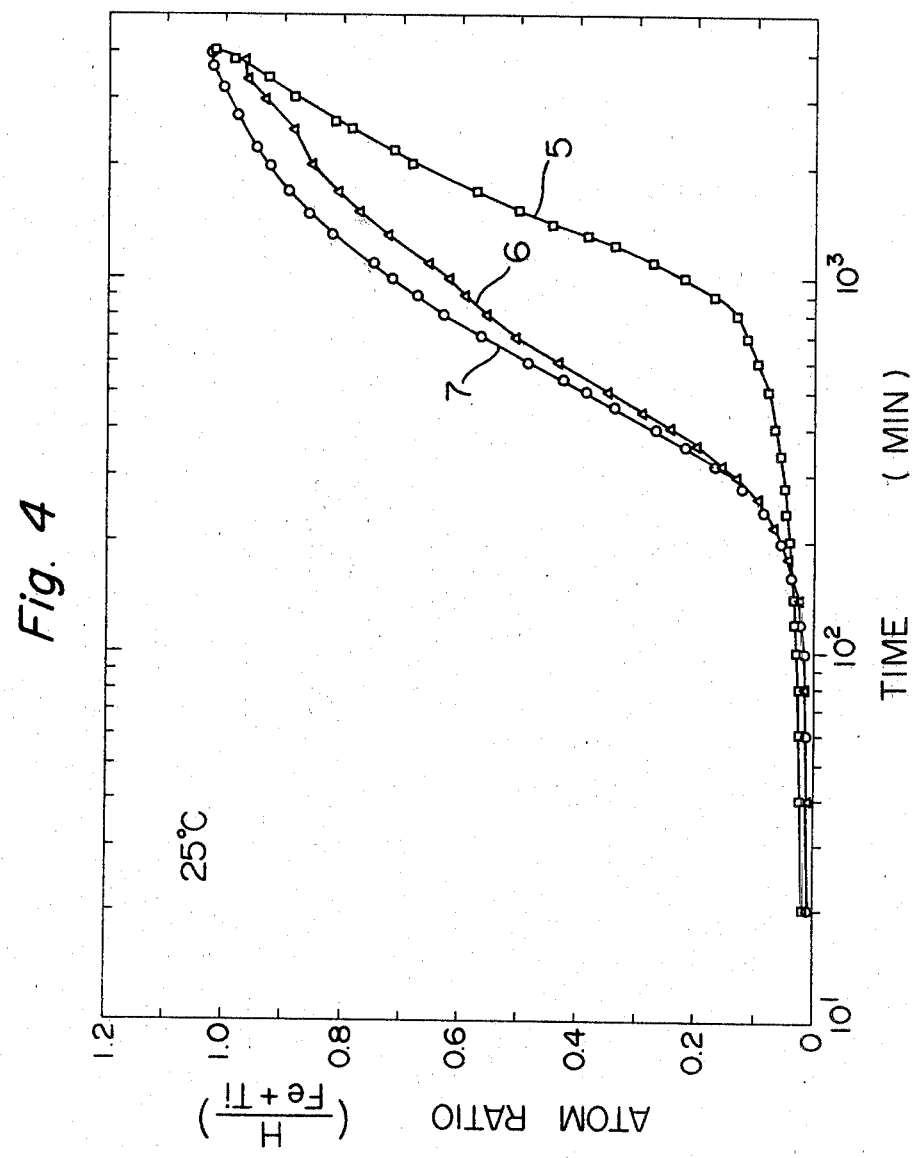

The hydrogen absorbing speeds at 25° C., and the absorption and releasing isothermal curves at 40° C. of the finely pulverized composite materials are shown in FIGS. 4 and 7 as follows:

| | | FIG. 7 | |
|---|---|---|---|
| Composition | FIG. 4 | absorption | releasing |
| (a) | 5 | 5-a | 5-b |
| (b) | 6 | 6-a | 6-b |
| (c) | 7 | 7-a | 7-b |

EXAMPLE 4

Composite materials having the following compositions were produced and pulverized to a particle diameter smaller than 100 mesh in the same way as in Example 2.

(d) $FeTi_{1.22}$
(e) $FeTi_{1.22}$-$2.9Fe_7Ti_{10}O_3$
(f) $FeTi_{1.22}$-$9.5Fe_7Ti_{10}O_3$

Figure 5:
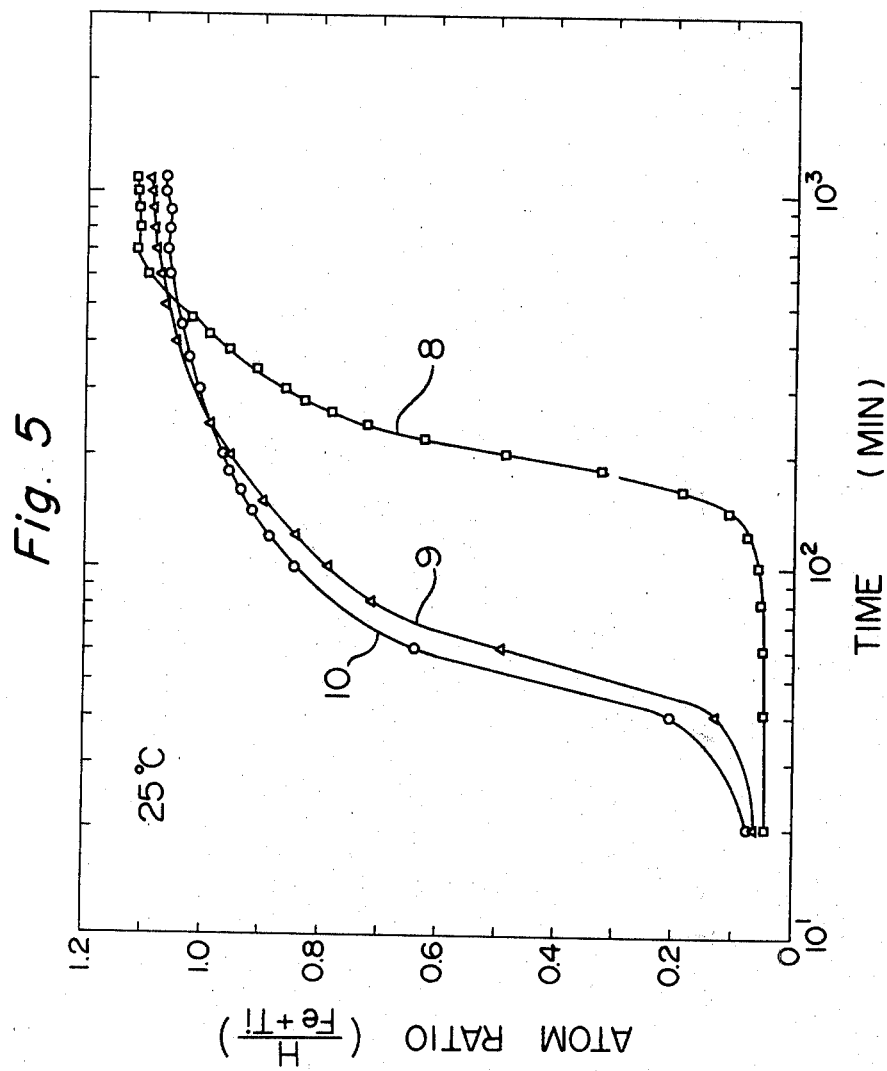

The hydrogen absorbing speeds at 25° C. and the absorption and releasing isothermal curves at 40° C. of the resulting fine powders of the composite materials are shown in FIGS. 5 and 8 as follows:

| | | FIG. 8 | |
|---|---|---|---|
| Compostion | FIG. 5 | Absorption | Releasing |
| (d) | 8 | 8-a | 8-b |
| (e) | 9 | 9-a | 9-b |
| (f) | 10 | 10-a | 10-b |

EXAMPLE 5

Composite materials having the following compositions were produced and pulverized to a particle diameter smaller than 100 mesh in the same way as in Example 2.

Figure 6:
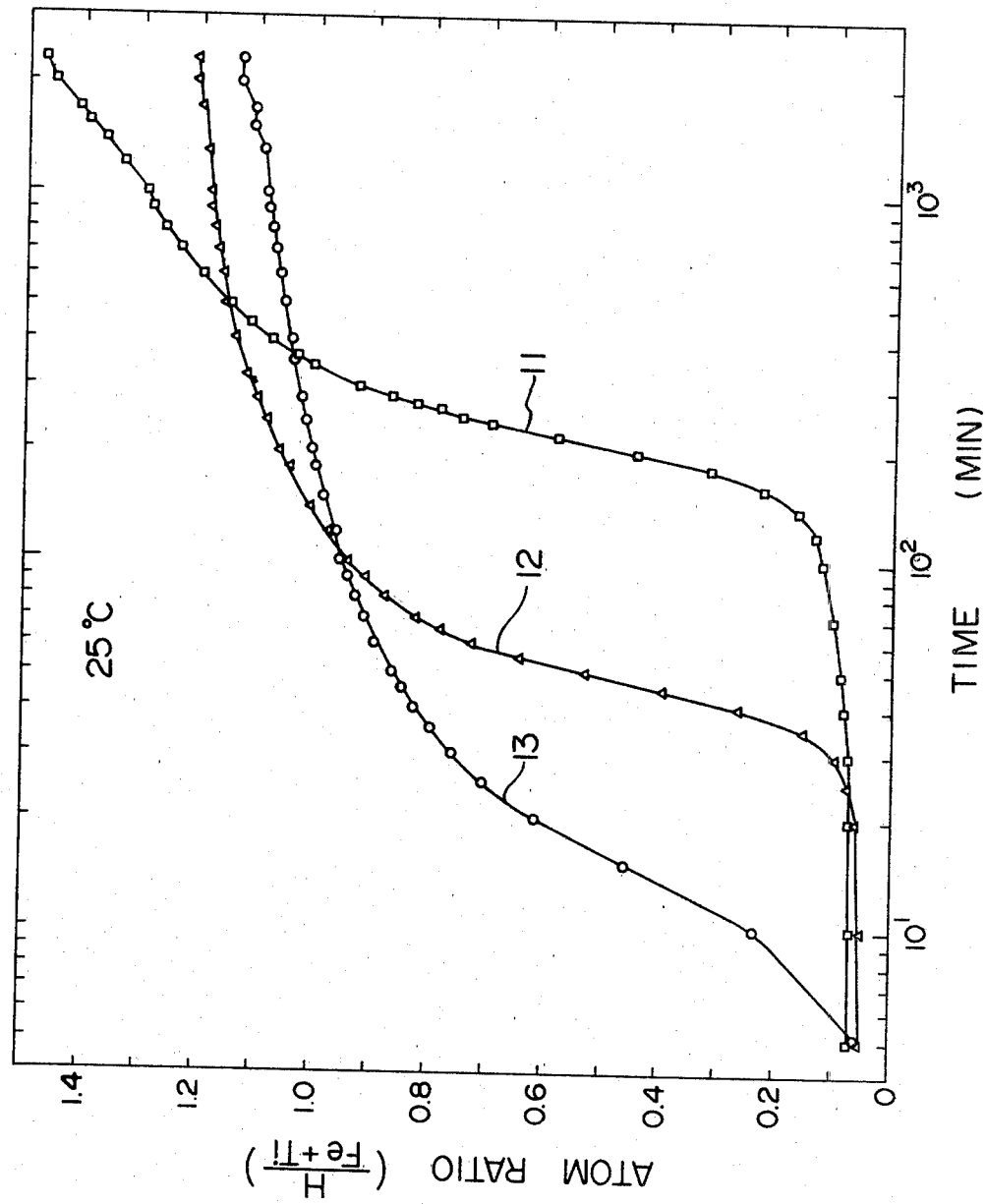
Figure 9:
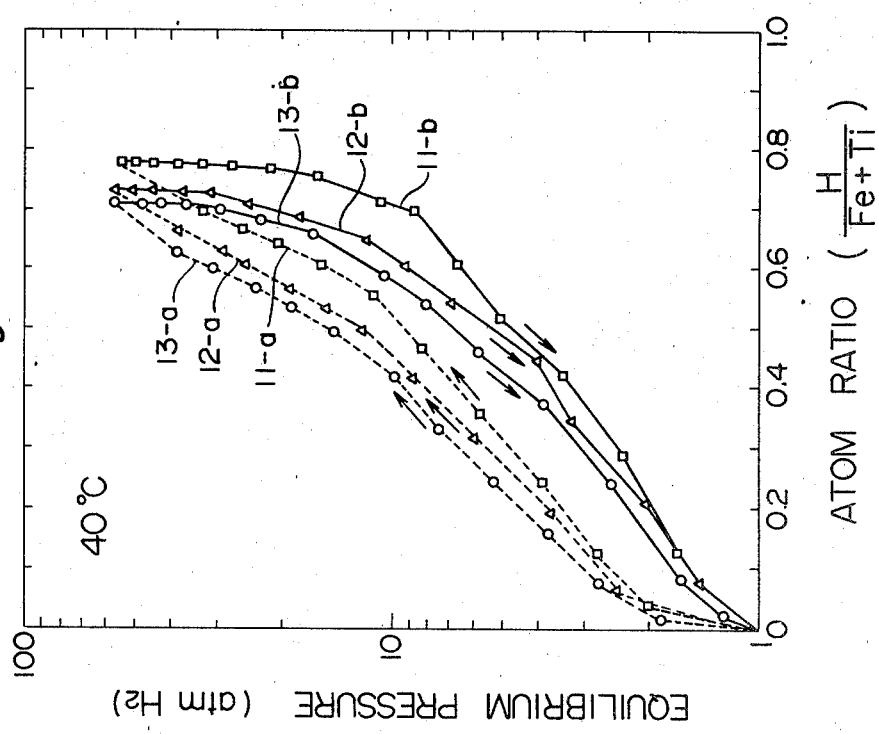

(g) $FeTi_{1.27}$
(h) $FeTi_{1.27}$-$2.9Fe_7Ti_{10}O_3$
(i) $FeTi_{1.27}$-$9.5Fe_7Ti_{10}O_3$  same The hydrogen absorbing speeds at 25° C. and the absorption and releasing isothermal curves at 40° C. of the fine powders of the composite materials are shown in FIGS. 6 and 9 as follows:

| | | FIG. 9 | |
|---|---|---|---|
| Composition | FIG. 6 | Absorption | Releasing |
| (g) | 11 | 11-a | 11-b |
| (h) | 12 | 12-a | 12-b |
| (i) | 13 | 13-a | 13-b. |

EXAMPLE 6

Composite materials having the following compositions were produced and pulverized to a particle diameter smaller than 100 mesh in the same way as in Example 2.

(j) $FeTi_{1.38}$
(k) $FeTi_{1.38}$-$2.9Fe_7Ti_{10}O_3$
(l) $FeTi_{1.38}$-$9.5Fe_7Ti_{10}O_3$

Figure 10:
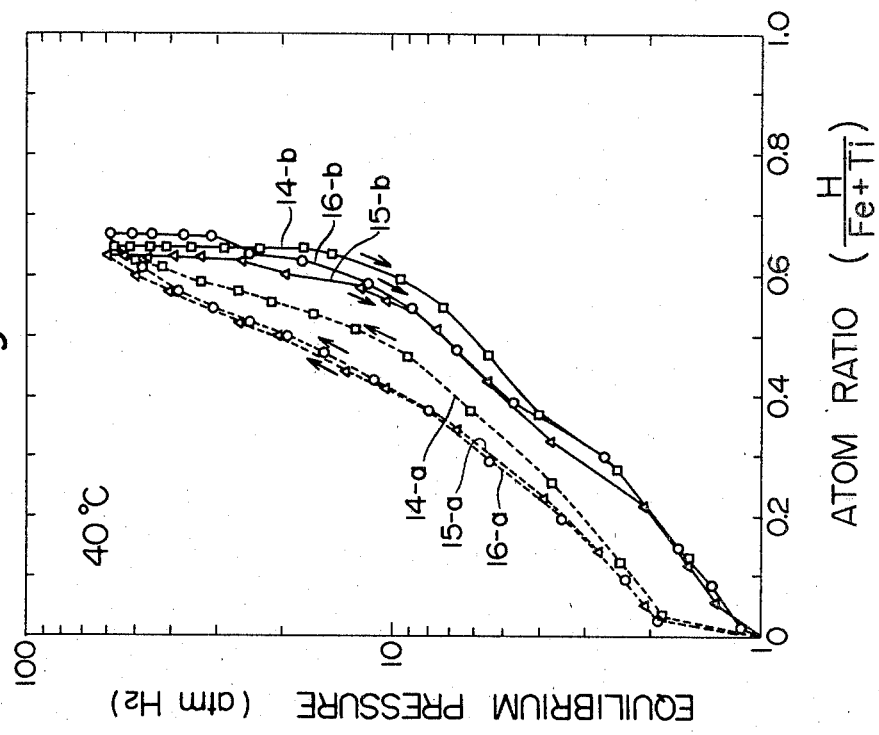

The hydrogen absorption and releasing isothermal curves at 40° C. of the resulting fine powdery composite materials are shown in FIG. 10 as follows:

FIG. 10

| Composition | Absorption | Releasing |
| --- | --- | --- |
| (j) | 14-a | 14-b |
| (k) | 15-a | 15-b |
| (l) | 16-a | 16-b |

EXAMPLE 7

Composite materials of the following compositions were produced and pulverized to a particle diameter smaller than 100 mesh in the same way as in Example 2.

The hydrogen releasing isothermal curves at 40° C. of the resulting fine powdery composite materials are shown in FIG. 11 as follows:

| Composition | FIG. 11 |
| --- | --- |
| (m) $FeTi_{1.08}$ | 17 |
| (n) $FeTi_{1.08}$—$1Fe_7Ti_{10}O_3$ | 18 |
| (o) $FeTi_{1.08}$—$1.9Fe_7Ti_{10}O_3$ | 19 |
| (p) $FeTi_{1.08}$—$8.8Fe_7Ti_{10}O_3$ | 20 |
| (q) $FeTi_{1.08}$—$16Fe_7Ti_{10}O_3$ | 21 |
| (r) $FeTi_{1.08}$—$28Fe_7Ti_{10}O_3$ | 22. |

EXAMPLE 8

Composite materials having the following compositions were produced and pulverized to a particle diameter smaller than 100 mesh in the same way as in Example 2.

The hydrogen releasing isothermal curves at 40° C. of the resulting fine powdery composite materials are shown in FIG. 12 as follows:

| Compostion | FIG. 12 |
| --- | --- |
| (s) $FeTi_{1.3}$ | 23 |
| (t) $FeTi_{1.13}$—$1Fe_7Ti_{10}O_3$ | 24 |
| (u) $FeTi_{1.13}$—$1.9Fe_7Ti_{10}O_3$ | 25 |
| (v) $FeTi_{1.13}$—$8.8Fe_7Ti_{10}O_3$ | 26 |
| (w) $FeTi_{1.13}$—$16Fe_7Ti_{10}O_3$ | 27 |
| (x) $FeTi_{1.13}$—$28Fe_7Ti_{10}O_3$ | 28. |

As is clear from the above-given Examples, the composite materials of this invention comprising an alloy matrix of iron and titanium and dispersed therein as separate phases an oxide composed of iron, titanium and oxygen have a fast rate of hydrogen absorption at room temperature, and can absorb a large quantity of hydrogen, and release a large quantity of the absorbed hydrogen. Thus, they have superior properties as a hydrogen storage material.

While it is necessary in customary practice to reduce the pressure of the inside of a pressure container having the hydrogen storage material of the invention therein to a high vacuum of, for example, about $5 \times 10^{-6}$ mmHg before hydrogen is introduced thereinto, investigations of the present inventors have shown that hydrogen absorption is possible in quite the same way as in the formation of a high vacuum from the outset by first forming a vacuum of $10^{-2}$ to $10^{-3}$ mmHg (which vacuum is easily formable), then introducing hydrogen, again forming a vacuum of about $10^{-2}$ to $10^{-3}$ mmHg, and then introducing hydrogen under high pressure.

What we claim is:

1. A hydrogen storage material comprising a composite material comprising a matrix of an alloy consisting essentially of iron and titanium in an iron/titanium atomic ratio of 1/1.11–1.40, and dispersed therein as separate phases, a metallic oxide composed of iron, titanium and oxygen wherein the amount of said metallic oxide is 1.5 to 28% by weight based on the total weight of said composite material.

2. The hydrogen storage material of claim 1 wherein the amount of said metallic oxide is 1.5 to 9% by weight based on the total weight of said composite material.

3. The hydrogen storage material of any one of claims 1 to 3 wherein said metallic oxide has an iron/titanium/oxygen atomic ratio of 1/1.4–2.5/0.4–0.6.

4. A hydrogen storage material comprising a composite material comprising a matrix of an alloy consisting essentially of iron and titanium in an iron/titanium atomic ratio of 1/1.11–1.40, and dispersed therein as separate phases, 1.5 to 28% by weight, based on the total weight of said composite material, of a metallic oxide composed of iron, titanium and oxygen.

5. The hydrogen storage material of claim 1 or 4 wherein said alloy matrix has an iron/titanium atomic ratio of 1/1.11–1.30.

6. A hydrogen storage material comprising a composite material comprising a matrix of an alloy consisting essentially of iron and titanium in an iron/titanium atomic ratio of 1/1.11–1.30, and dispersed therein as separate phases, a metallic oxide composed of iron, titanium and oxygen, said matrix being a mixed phase of FeTi phase and Ti solid solution phase wherein the amount of said metallic oxide is 1.5 to 28% by weight based on the total weight of said composite material.

* * * * *